(12) United States Patent
Chae et al.

(10) Patent No.: US 11,164,581 B2
(45) Date of Patent: Nov. 2, 2021

(54) ARTIFICIAL INTELLIGENCE DEVICE

(71) Applicant: LG ELECTRONICS INC., Seoul (KR)

(72) Inventors: Jonghoon Chae, Seoul (KR); Yongchul Park, Seoul (KR); Siyoung Yang, Seoul (KR); Juyeong Jang, Seoul (KR); Sungmin Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 143 days.

(21) Appl. No.: 16/538,172

(22) Filed: Aug. 12, 2019

(65) Prior Publication Data

US 2020/0051564 A1 Feb. 13, 2020

(30) Foreign Application Priority Data

Aug. 13, 2018 (KR) .......................... 10-2018-0094630

(51) Int. Cl.
| | | |
|---|---|---|
| *G10L 15/00* | (2013.01) | |
| *G10L 15/22* | (2006.01) | |
| *G10L 25/90* | (2013.01) | |
| *G10L 15/02* | (2006.01) | |
| *G10L 15/16* | (2006.01) | |
| *G10L 25/30* | (2013.01) | |

(52) U.S. Cl.
CPC .............. *G10L 15/22* (2013.01); *G10L 15/02* (2013.01); *G10L 25/90* (2013.01); *G10L 15/16* (2013.01); *G10L 25/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,442,827 | B2 * | 5/2013 | Duffield | .............. H04M 3/4936 |
| | | | | 704/254 |
| 8,630,860 | B1 * | 1/2014 | Zhang | ..................... G10L 15/26 |
| | | | | 704/275 |
| 2002/0120450 | A1 | 8/2002 | Junqua et al. | |
| 2004/0006483 | A1 | 1/2004 | Sasaki et al. | |

(Continued)

FOREIGN PATENT DOCUMENTS

| | | |
|---|---|---|
| JP | 2004109323 | 4/2004 |
| JP | 2004522186 | 7/2004 |

(Continued)

OTHER PUBLICATIONS

PCT International Application No. PCT/KR2019/010330, Written Opinion of the International Searching Authority dated Nov. 25, 2019, 10 pages.

(Continued)

*Primary Examiner* — Vu B Hang
(74) *Attorney, Agent, or Firm* — Lee, Hong, Degerman, Kang & Waimey

(57) ABSTRACT

An artificial intelligence device includes a speaker, a microphone configured to receive a user's speech, and one or more controllers configured to extract an utterance feature of the received speech, determine a user type corresponding to the extracted utterance feature, map a speech agent associated with the determined user type, and output an audio response through the speaker using the mapped speech agent.

11 Claims, 12 Drawing Sheets

(56) References Cited

U.S. PATENT DOCUMENTS

2007/0233484 A1   10/2007  Coelho
2014/0270108 A1    9/2014  Riahi et al.
2018/0240459 A1*  8/2018  Weng ...................... G10L 15/22

FOREIGN PATENT DOCUMENTS

JP         2005293193     10/2005
KR   1020069070605     6/2006

OTHER PUBLICATIONS

Korean Intellectual Property Office Application No. 10-2018-0094630, Notice of Allowance dated Jan. 5, 2021, 8 pages.

* cited by examiner

FIG. 8

USER UTTERANCE FEATURE ANALYSIS

| EXTRACTION SOURCE | UTTERANCE FEATURE | EXTRACTION/ANALYSIS METHOD |
|---|---|---|
| TEXT | WORD | * Bag-of-Word Model |
| TEXT | TOPIC | * Text Categorization |
| TEXT/AUDIO | TONE | ENDING/STEM ANALYSIS |
| TEXT/AUDIO | DIALECT | ENDING/STEM/PITCH ANALYSIS |
| AUDIO | GENDER | PITCH ANALYSIS |
| AUDIO | PITCH | PITCH ANALYSIS |
| AUDIO | SPEED | ANALYSIS OF NUMBER OF WORDS PER UNIT TIME |
| AUDIO | AGE | SPECTRUM ANALYSIS |
| GPS | POSITION | GPS ANALYSIS |

ARTIFICIAL INTELLIGENCE DEVICE

Pursuant to 35 U.S.C. § 119(a), this application claims the benefit of earlier filing date and right of priority to Korean Patent Application No. 10-2018-0094630, filed on Aug. 13, 2018, the contents of which are all hereby incorporated by reference herein in its entirety.

BACKGROUND OF THE INVENTION

The present invention relates to an artificial intelligence device, and more particularly, to an artificial intelligence device for providing a speech agent service suiting a user.

Context awareness technology capable of recognizing a user's situation using artificial intelligence and providing information desired by the user in a desired form has been actively studied.

As the context awareness technology has been developed, demands for a mobile terminal capable of performing a function suiting a user's situation have been increased.

A speech agent service using artificial intelligence may provide necessary information to a user in response to a user's speech.

However, since a conventional speech agent service outputs a speech in a uniform form, a service suiting a user type cannot be provided.

SUMMARY OF THE INVENTION

An object of the present invention is to provide an artificial intelligence device capable of analyzing an utterance feature of a user and providing a speech agent service suiting the user.

To achieve the above objects, an embodiment of the present disclosure includes an artificial intelligence device including a speaker, a microphone configured to receive a user's speech, and a controller configured to extract an utterance feature of the received speech, to generate a user type corresponding to the extracted utterance feature, to map a speech agent associated with the generated user type, and to output an audio response through the speaker using the mapped speech agent.

According to another embodiment of the present invention, there is provided an artificial intelligence device including a speaker, a microphone configured to receive a user's speech, and a controller configured to extract an utterance feature of the received speech, to generate a user type corresponding to the extracted utterance feature, to map a speech agent associated with the generated user type, and to output an audio response through the speaker using the mapped speech agent, wherein, if the utterance feature extracted from a re-received speech is changed, the controller maps a speech agent associated with a new user type corresponding to the changed utterance feature.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

FIG. 8 is a view showing an example of analyzing a user's utterance feature according to an embodiment of the present invention.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that if an element is referred to as being "connected with" another element, the element can be directly connected with the other element or intervening elements may also be present. In contrast, if an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of terminals. However, such teachings apply equally to other types of terminals, such as those types noted herein. In addition, these teachings may also be applied to stationary terminals such as digital TV, desktop computers, and the like.

Figure 1A:
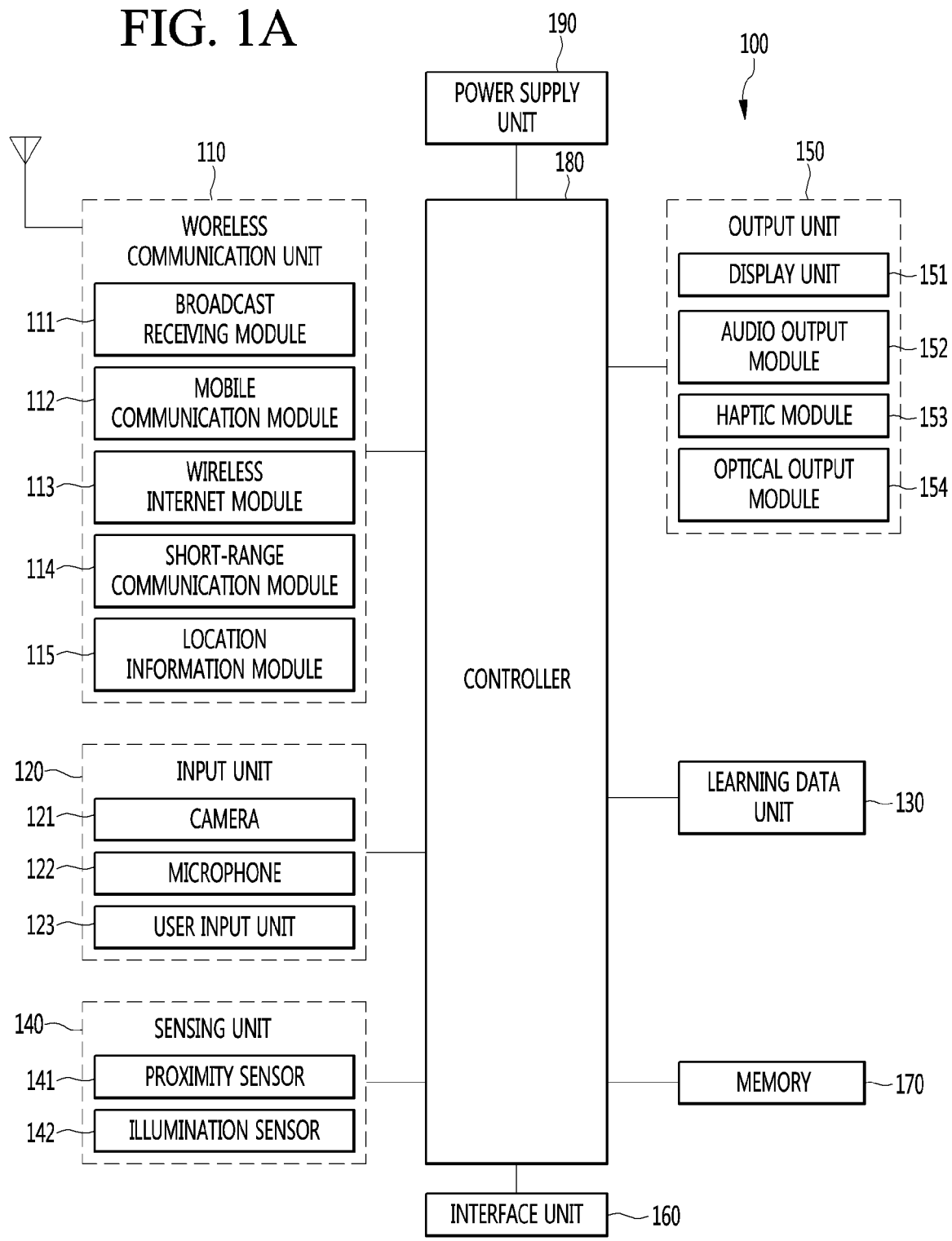
FIG. 1A is a block diagram of a mobile terminal in accordance with the present disclosure.
Figure 1B:
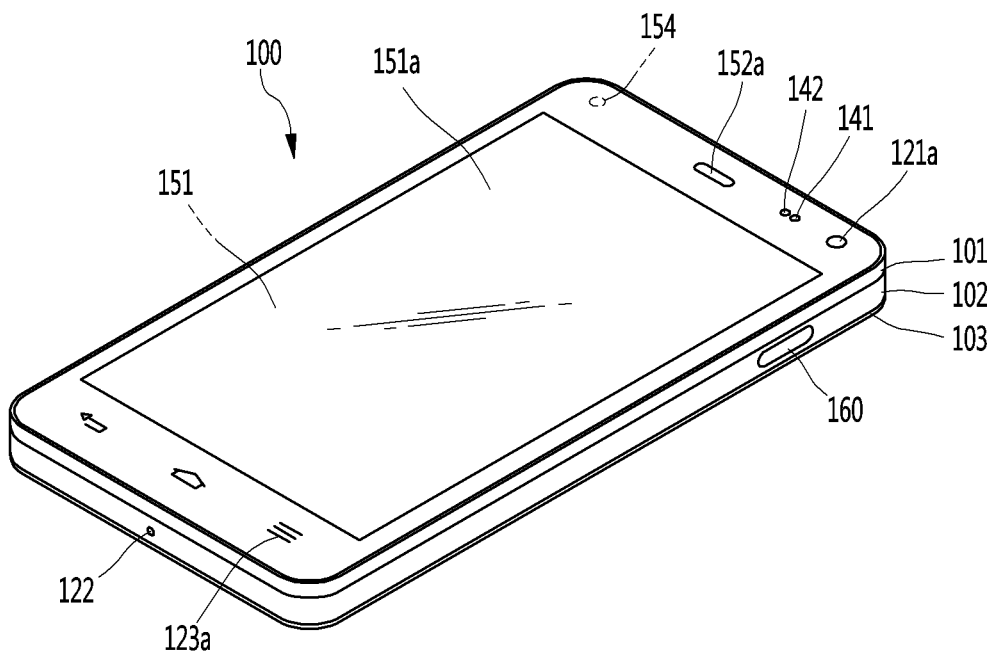
FIGS. 1B and 1C are views of one example of the mobile terminal, viewed from different directions.
Figure 1C:
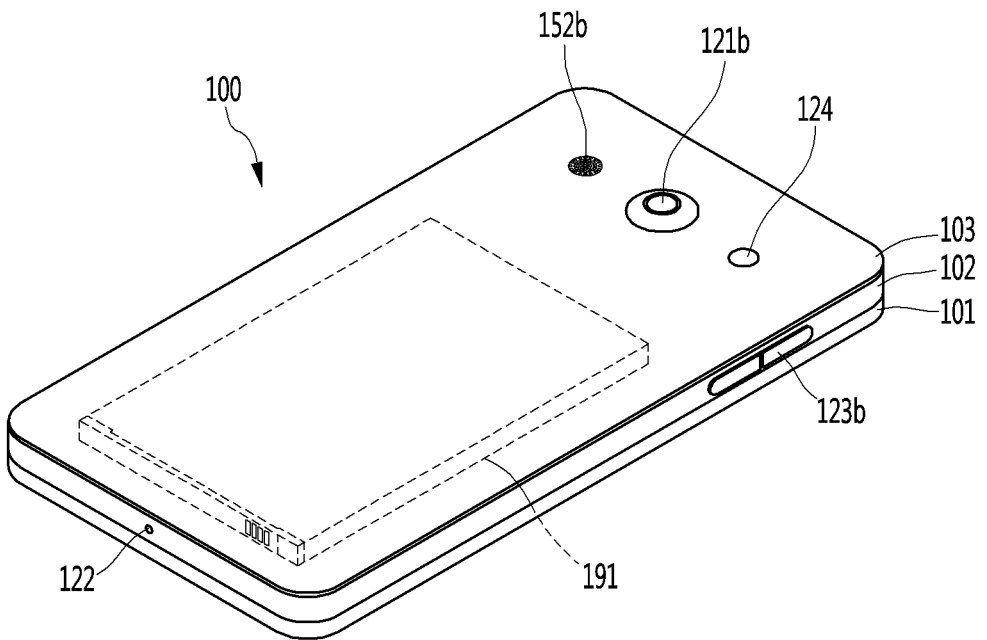

Reference is now made to FIGS. 1A-1C, where FIG. 1A is a block diagram of a terminal in accordance with the present disclosure, FIG. 1B is a perspective view of a front side of a terminal according to an embodiment of the present invention, and FIG. 1C is a rear view of the terminal shown in FIG. 1B.

The terminal 100 may include components, such as a wireless communication unit 110, an input unit 120, learning data unit 130, a sensing unit 140, an output unit 150, an interface unit 160, a memory 170, a controller 180, a power supply unit 190 and the like. FIG. 1A illustrates the terminal having various components, but it is understood that implementing all of the illustrated components is not a requirement, and that greater or fewer components may alternatively be implemented.

In more detail, the wireless communication unit 110 of those components may typically include one or more modules which permit wireless communications between the terminal 100 and a wireless communication system, between the terminal 100 and another terminal 100, or between the terminal 100 and an external server.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The learning data unit 130 may be configured to receive, categorize, store, and output information to be utilized for data mining, data analysis, intelligent decision making, and machine learning algorithms and techniques. The learning data unit 130 may include one or more memory units configured to store data that is received, detected, sensed, generated, predefined, or otherwise output by the terminal, or received, detected, sensed, generated, predefined, or otherwise output by another component, device, terminal, or entity in communication with the terminal.

The learning data unit 130 may include memory incorporated or implemented at the terminal. In some embodiments, learning data unit 130 may be implemented using memory 170. Alternatively or additionally, the learning data unit 130 may be implemented using memory associated with the terminal, such as an external memory directly coupled to the terminal or memory maintained at a server in communication with the terminal. In other embodiments, the learning data unit 130 may be implemented using memory maintained in a cloud computing environment, or other remote memory location that is accessible by the terminal through a communication scheme, such as a network.

The learning data unit 130 is generally configured to store data in one or more databases to identify, index, categorize, manipulate, store, retrieve, and output the data for use in supervised or unsupervised learning, data mining, predictive analytics, or other machine learning techniques. The information stored at the learning data unit 130 may be utilized by the controller 180, or one or more other controllers of the terminal, using any of a variety of different types of data analysis and machine learning algorithms and techniques. Examples of such algorithms and techniques include k-Nearest neighbor systems, fuzzy logic (e.g., possibility theory), neural networks, boltzmann machines, vector quantization, pulsed neural nets, support vector machines, maximum margin classifiers, hill-climbing, inductive logic systems, bayesian networks, petri nets (e.g., finite state machines, mealy machines, moore finite state machines), classifier trees (e.g., perceptron trees, support vector trees, markov trees, decision tree forests, random forests), pandemonium models and systems, clustering, artificially intelligent planning, artificially intelligent forecasting, data fusion, sensor fusion, image fusion, reinforcement learning, augmented reality, pattern recognition, automated planning, and the like.

The controller 180 may request, retrieve, receive, or otherwise utilize the data of the learning data unit 130 to determine or predict at least one executable operation of the terminal based on the information determined or generated using the data analysis and machine learning algorithms and techniques, and control the terminal to execute a predicted or desired operation among the at least one executable operation. The controller 180 may perform various functions implementing emulation of intelligence (i.e., knowledge based systems, reasoning systems, and knowledge acquisition systems); and including systems for reasoning with uncertainty (e.g., fuzzy logic systems), adaptive systems, machine learning systems, artificial neural networks, and the like.

The controller 180 may also include sub-modules to enable its performance and/or execution involving voice and natural speech language processing, such as an I/O processing module, environment condition module, a speech-to-text (STT) processing module, a natural language processing module, a task flow processing module, and a service processing module. Each of these sub-modules may also have access to one or more systems or data and models at the terminal, or a subset or superset thereof, including scheduling, vocabulary index, user data, task flow models, service models, and automatic speech recognition (ASR) systems. In other embodiments, the controller 180 or other aspects of the terminal may be implemented with said sub-modules, systems, or data and models.

In some examples, based on the data at the learning data unit 130, the controller 180 may be configured to perform detecting and sensing a need based on a contextual condition or a user's intent expressed in a user input or natural language input; actively eliciting and/or obtaining information needed to fully determine a need based on the contextual condition or a user's intent (e.g., by analyzing historical data including historical input and output, pattern matching, disambiguating words, input intentions, etc.); determining the task flow for executing a function in response to the need based on the contextual condition or user's intent; and executing the task flow to meet the need based on the contextual condition or user's intent.

In some embodiments, the controller 180 may implement specific hardware elements dedicated for learning data processes including memistors, memristors, transconductance amplifiers, pulsed neural circuits, artificially intelligent nanotechnology systems (e.g., autonomous nanomachines) or artificially intelligent quantum mechanical systems (e.g., quantum neural networks), and the like. In some embodiments, the controller 180 may include pattern recognition systems such as machine vision systems, acoustic recognition systems, handwriting recognition systems, data fusion systems, sensor fusion systems, and soft sensors. Machine vision systems can also include content based image retrieval, optical character recognition, augmented reality, egomotion, tracking or optical flow, and the like.

The controller 180 may be configured to collect, sense, monitor, extract, detect, and/or receive signals or data, via one or more sensing components at the terminal, in order to collect information for processing and storage at the learning data unit 130 and for use in data analysis and machine learning operations. Collection of information may include sensing information through a sensor, extracting information stored in the memory, such as memory 170, or receiving information from another terminal, entity, or an external storage through communication means. Thus in one example, the controller 180 may collect historical usage information at the terminal, store the historical usage information for use in data analytics, and at a future occurrence, determine a best match for executing a particular function using predictive modeling based on the stored historical usage information.

The controller 180 may also receive or sense information of the surrounding environment, or other information, through the sensing unit 140. In addition, the controller 180 may receive broadcast signals and/or broadcast-related information, wireless signals, wireless data, and the like through the wireless communication unit 110. The controller 180 may also receive image information (or a corresponding signal), audio information (or a corresponding signal), data, or user-input information from an input unit.

The controller 180 may collect information in real time, and process or categorize the information (for example, in a knowledge graph, command policy, personalization database, dialog engine, etc.), and store the processed information in the memory 170 or the learning data unit 130.

If the operation of the terminal is determined based on data analysis and machine learning algorithms and techniques, the controller 180 may control the components of the terminal to execute the determined operation. The controller 180 may then execute the determined operation by controlling the terminal based on the control command.

In some embodiments, if a specific operation is executed, the controller 180 may analyze history information indicating the execution of the specific operation through data analysis and machine learning algorithms and techniques and execute updating of previously-learned information based on the analyzed information. Accordingly, the controller 180, in combination with the learning data unit 130, can improve the accuracy of future performance of the data analysis and machine learning algorithms and techniques based on the updated information.

The sensing unit 140 may include at least one sensor which senses at least one of internal information of the terminal, a surrounding environment of the terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output unit 152, a haptic module 153, an optical output unit 154 and the like. The display unit 151 may have an inter-layered structure or an integrated structure with a touch sensor so as to implement a touch screen. The touch screen may provide an output interface between the terminal 100 and a user, as well as functioning as the user input unit 123 which provides an input interface between the terminal 100 and the user.

The interface unit 160 may serve as an interface with various types of external devices connected with the terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The terminal 100 may execute an appropriate control associated with a connected external device, in response to the external device being connected to the interface unit 160.

The memory 170 may store a plurality of application programs (or applications) executed in the terminal 100, data for operations of the terminal 100, instruction words, and the like. At least some of those application programs may be downloaded from an external server via wireless communication. Some others of those application programs may be installed within the terminal 100 at the time of being shipped for basic functions of the terminal 100 (for example, receiving a call, placing a call, receiving a message, sending a message, etc.). On the other hand, the application programs may be stored in the memory 170, installed in the terminal 100, and executed by the controller 180 to perform an operation (or a function) of the terminal 100.

The controller 180 may typically control an overall operation of the terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Terminal 100 is shown implemented with one controller 180 facilitating operation of all of the various units (e.g., wireless communication unit 110, input unit 120, learning data unit 130, sensing unit 140, output unit 150, interface unit 160, etc.) and submodules shown in the figure. However, one or more separate controllers 180 may alternatively be implemented for any or all of such units and submodules. For example, the learning data unit 130 may be implemented as a separate controller or processor dedicated for performing artificial-intelligence calculations and operations.

Furthermore, the controller 180 may control at least part of the components illustrated in FIG. 1A, in order to drive the application programs stored in the memory 170. In addition, the controller 180 may drive the application programs by combining at least two of the components included in the terminal 100 for operation.

The power supply unit 190 may receive external power or internal power and supply appropriate power required for operating respective elements and components included in the terminal 100 under the control of the controller 180. The power supply unit 190 may include a battery, and the battery may be an embedded battery or a replaceable battery.

At least part of those elements and components may be combined to implement operation and control of the terminal or a control method of the terminal according to various exemplary embodiments described herein. Also, the operation and control or the control method of the terminal may be implemented in the terminal in such a manner of activating at least one application program stored in the memory 170.

Hereinafter, each aforementioned component will be described in more detail with reference to FIG. 1A, prior to explaining various exemplary embodiments implemented by the terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the terminal 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like). The wireless signals may include audio call signal, video (telephony) call signal, or various formats of data according to transmission/reception of text/multimedia messages.

The wireless Internet module 113 denotes a module for wireless Internet access. This module may be internally or externally coupled to the terminal 100. The wireless Internet module 113 may transmit/receive wireless signals via communication networks according to wireless Internet technologies. Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the terminal 100 and a wireless communication system, between the terminal 100 and another terminal 100, or between the terminal and a network where another terminal 100 (or an external server) is located, via wireless personal area networks.

Here, the another terminal 100 may be a wearable device, for example, a smart watch, smart glasses or a head mounted display (HMD), which is able to exchange data with the terminal 100 (or to like data with the terminal 100). The short-range communication module 114 may sense (recognize) a wearable device, which is able to communicate with the terminal), near the terminal 100. In addition, if the sensed wearable device is a device which is authenticated to communicate with the terminal 100 according to the present disclosure, the controller 180 may transmit at least part of data processed in the terminal 100 to the wearable device via the short-range communication module 114. Hence, a user of the wearable device may use the data processed in the terminal 100 on the wearable device. For example, if a call is received in the terminal 100, the user may answer the call using the wearable device. Also, if a message is received in the terminal 100, the user may check the received message using the wearable device.

The location information module 115 denotes a module for detecting or calculating a position of the terminal. An example of the location information module 115 may include a Global Position System (GPS) module or a Wi-Fi module. For example, if the terminal uses the GPS module, a position of the terminal may be acquired using a signal sent from a GPS satellite. As another example, if the terminal uses the Wi-Fi module, a position of the terminal may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the terminal. As a module used to acquire the location (or current location) of the terminal, the location information module 115 may not be necessarily limited to a module for directly calculating or acquiring the location of the terminal.

Next, the input unit 120 may be configured to provide an audio or video signal (or information) input to the terminal or information input by a user to the terminal. For the input of the audio information, the terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the terminal 100 may be arranged in a matrix configuration. By use of the cameras 121 having the matrix configuration, a plurality of image information having various angles or focal points may be input into the terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the terminal 100 (or an application program being executed). On the other hand, the microphone 122 may include assorted noise removing algorithms to remove noise generated in the course of receiving the external audio signal.

The user input unit 123 may receive information input by a user. If information is input through the user input unit 123, the controller 180 may control an operation of the terminal 100 to correspond to the input information. The user input unit 123 may include a mechanical input element (or a mechanical key, for example, a button located on a front/rear surface or a side surface of the terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

On the other hand, the sensing unit 140 may sense at least one of internal information of the terminal, surrounding environment information of the terminal and user information, and generate a sensing signal corresponding to it. The controller 180 may control an operation of the terminal 100 or execute data processing, a function or an operation associated with an application program installed in the terminal based on the sensing signal. Hereinafter, description will be given in more detail of representative sensors of various sensors which may be included in the sensing unit 140.

First, a proximity sensor 141 refers to a sensor to sense presence or absence of an object approaching a surface to be sensed, or an object disposed near a surface to be sensed, by using an electromagnetic field or infrared rays without a mechanical contact. The proximity sensor 141 may be arranged at an inner region of the terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. If the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized as a proximity sensor.

On the other hand, for the sake of brief explanation, a state that the pointer is positioned to be proximate onto the touch screen without contact will be referred to as 'proximity touch,' whereas a state that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

If touch inputs are sensed by the touch sensors as described above, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using this fact. In more detail, the position of the wave generation source may be calculated by using a time difference from the time that the ultrasonic wave reaches the sensor based on the light as a reference signal.

The camera 121 of the input unit 120 may be a type of camera sensor. The camera sensor may include at least one of a photo sensor and a laser sensor. The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the terminal 100. For example, the display unit 151 may display execution screen information of an application program driven in the terminal 100 or user interface (UI) and graphic user interface (GUI) information in response to the execution screen information.

Furthermore, the display unit 151 may also be implemented as a stereoscopic display unit for displaying stereoscopic images. The stereoscopic display unit may employ a stereoscopic display scheme such as stereoscopic scheme (a glass scheme), an auto-stereoscopic scheme (glassless scheme), a projection scheme (holographic scheme), or the like.

The audio output unit 152 may output audio data received from the wireless communication unit 110 or stored in the memory 170 in a call signal reception mode, a call mode, a record mode, a voice recognition mode, a broadcast reception mode, and the like. Also, the audio output unit 152 may also provide audible output signals related to a particular function (e.g., a call signal reception sound, a message reception sound, etc.) performed by the terminal 100. The audio output unit 152 may include a receiver, a speaker, a buzzer or the like.

A haptic module 153 may generate various tactile effects that can be felt by a user. A representative example of tactile effect generated by the haptic module 153 may be vibration. The intensity, pattern and the like of vibration generated by the haptic module 153 may be controlled by a user's selection or the settings of the controller. For example, the haptic module 153 may output different vibrations in a combined manner or in a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the terminal 100.

An optical output unit 154 may output a signal for indicating an event generation using light of a light source. Examples of events generated in the terminal 100 may include a message reception, a call signal reception, a missed call, an alarm, a schedule notice, an email reception, an information reception through an application, and the like. A signal output by the optical output unit 154 may be implemented in such a manner that the terminal emits monochromatic light or light with a plurality of colors. The signal output may be terminated as the terminal senses a user's event checking.

The interface unit 160 may serve as an interface with every external device connected with the terminal 100. For example, the interface unit 160 may receive data transmitted from an external device, receive power to transfer to each element within the terminal 100, or transmit internal data of the terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

Furthermore, if the terminal 100 is connected with an external cradle, the interface unit 160 may serve as a passage to allow power from the cradle to be supplied to the terminal 100 therethrough or may serve as a passage to allow various command signals input by the user from the cradle to be transferred to the terminal therethrough. Various command signals or power input from the cradle may operate as signals for recognizing that the terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the terminal 100 may be operated in relation to a web storage device that performs the storage function of the memory 170 over the Internet or other network.

As aforementioned, the controller 180 may typically control the general operations of the terminal 100. For example, the controller 180 may set or release a lock state for restricting a user from inputting a control command with respect to applications if a state of the terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein.

The power supply unit 190 may receive external power or internal power and supply appropriate power required for operating respective elements and components included in the terminal 100 under the control of the controller 180. The power supply unit 190 may include a battery. The battery may be an embedded battery which is rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, certain embodiments described herein may be implemented with separate software modules, such as procedures and functions, each of which perform one or more of the functions and operations described herein. The software codes can be implemented with a software application written in any suitable programming language and may be stored in memory (for example, memory 170), and executed by a controller or processor (for example, controller 180).

Referring to FIGS. 1B and 1C, the terminal 100 disclosed herein may be implemented using a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description to be associated with a specific type of terminal or on a specific type of terminal will be also typically applied to another type of terminal. The terminal body may be formed using at least one assembly.

The terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151*a* of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, if the rear cover 103 is detached from the rear case 102, the electronic components mounted to the rear case 102 may be externally exposed.

As illustrated, if the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the terminal 100 may be configured such that one case forms the inner space. In this example, a terminal 100 having a uni-body formed in such a manner that synthetic resin or metal extends from a side surface to a rear surface may also be implemented.

On the other hand, the terminal 100 may include a waterproofing unit (not shown) for preventing an introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space if those cases are coupled.

The terminal 100 may include a display unit 151, first and second audio output modules 152*a* and 152*b*, a proximity sensor 141, an illumination sensor 152, an optical output module 154, first and second cameras 121*a* and 121*b*, first and second manipulation units 123*a* and 123*b*, a microphone 122, an interface unit 160 and the like.

Hereinafter, description will be given of an exemplary terminal 100 that the display unit 151, the first audio output module 152*a*, the proximity sensor 141, the illumination sensor 142, the optical output module 154, the first camera 121*a* and the first manipulation unit 123*a* are disposed on the front surface of the terminal body, the second manipulation unit 123*b*, the microphone 122 and the interface unit 160 are disposed on a side surface of the terminal body, and the second audio output module 152*b* and the second camera 121*b* are disposed on a rear surface of the terminal body, with reference to FIGS. 1B and 1C.

Here, those components may not be limited to the arrangement, but be excluded or arranged on another surface if necessary. For example, the first manipulation unit 123*a* may not be disposed on the front surface of the terminal body, and the second audio output module 152*b* may be disposed on the side surface other than the rear surface of the terminal body.

The display unit 151 may output information processed in the terminal 100. For example, the display unit 151 may display execution screen information of an application program driven in the terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented using two or more displays. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. If a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Alternatively, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the terminal 100.

The optical output module 154 may output light for indicating an event generation. Examples of the event generated in the terminal 100 may include a message reception, a call signal reception, a missed call, an alarm, a schedule notice, an email reception, information reception through an application, and the like. If a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger if the user grabs the terminal body with one hand. However, the present disclosure may not be limited to this, and the position of the rear input unit may be changeable.

If the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, if the first manipulation unit 123a is not disposed on the front surface of the terminal body, the display unit 151 may be implemented to have a larger screen.

On the other hand, the terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' If the second camera 121b is implemented as the array camera, images may be captured in various manners using the plurality of lenses and images with better qualities may be obtained.

A flash 124 may be disposed adjacent to the second camera 121b. If an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1B), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1A) for supplying power to the terminal 100 may be disposed on the terminal body. The power supply unit 190 may include a battery which is mounted in the terminal body or detachably coupled to an outside of the terminal body.

The battery may receive power via a power source cable connected to the interface unit 160. Also, the battery may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery, so as to prevent separation of the battery and protect the battery from an external impact or foreign materials. If the battery is detachable from the terminal body, the rear case 103 may be detachably coupled to the rear case 102.

An accessory for protecting an appearance or assisting or extending the functions of the terminal 100 may further be provided on the terminal 100. As one example of the accessory, a cover or pouch for covering or accommodating at least one surface of the terminal 100 may be provided. The cover or pouch may cooperate with the display unit 151 to extend the function of the terminal 100. Another example of the accessory may be a touch pen for assisting or extending a touch input onto a touch screen.

Figure 2:
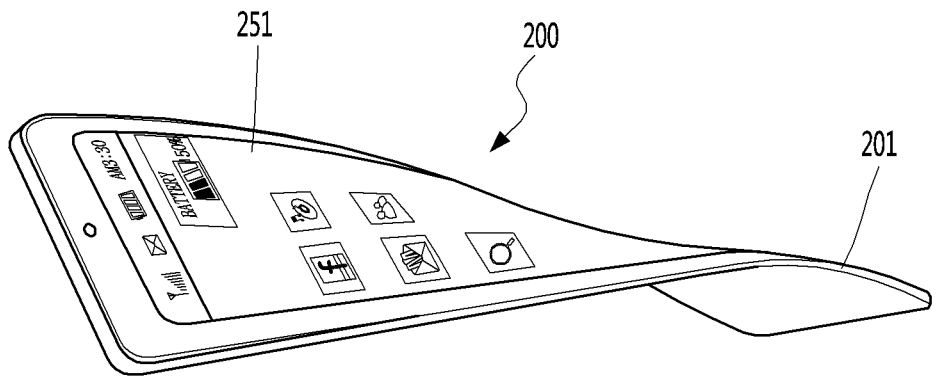
FIG. 2 is a view of a deformable mobile terminal according to an alternative embodiment of the present disclosure.

FIG. 2 is a view of a deformable mobile terminal according to an alternative embodiment of the present disclosure. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

If in a state that the flexible display unit 251 is not deformed (for example, in a state with an infinite radius of curvature and referred to as a first state), a display region of the flexible display unit 251 includes a generally flat surface. If in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, if an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. If a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, if the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, if a call is received in the mobile terminal 100, the user can answer the call using the wearable device. Also, if a message is received in the mobile terminal 100, the user can check the received message using the wearable device.

Figure 3:
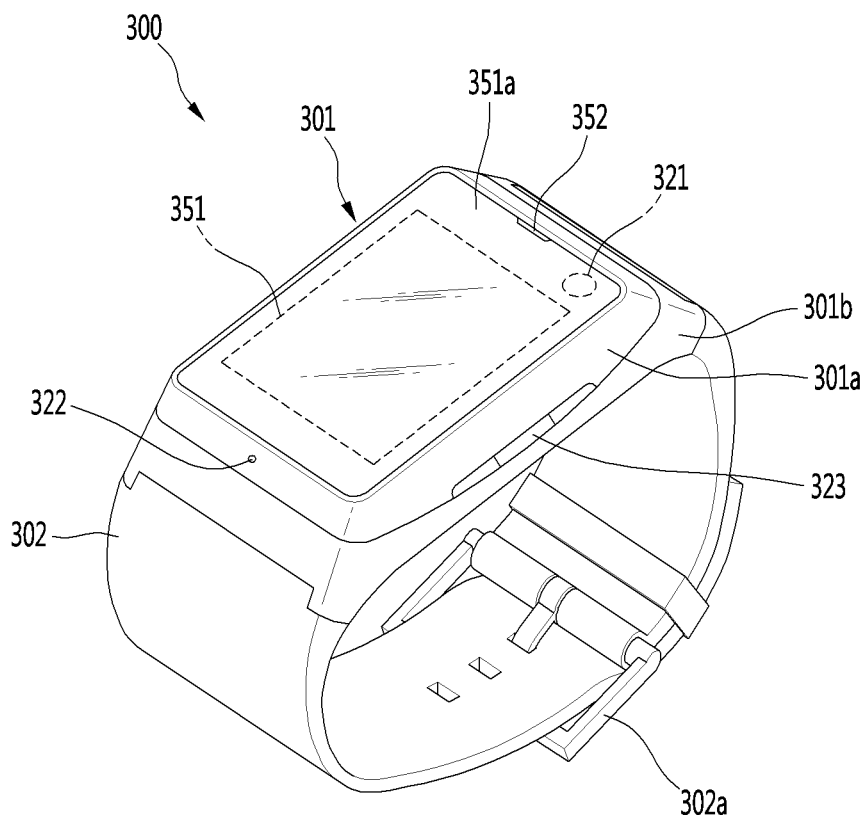
FIG. 3 is a view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. If the display unit 351 is implemented as a touch screen, additional function keys may be minimized or eliminated. For example, if the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
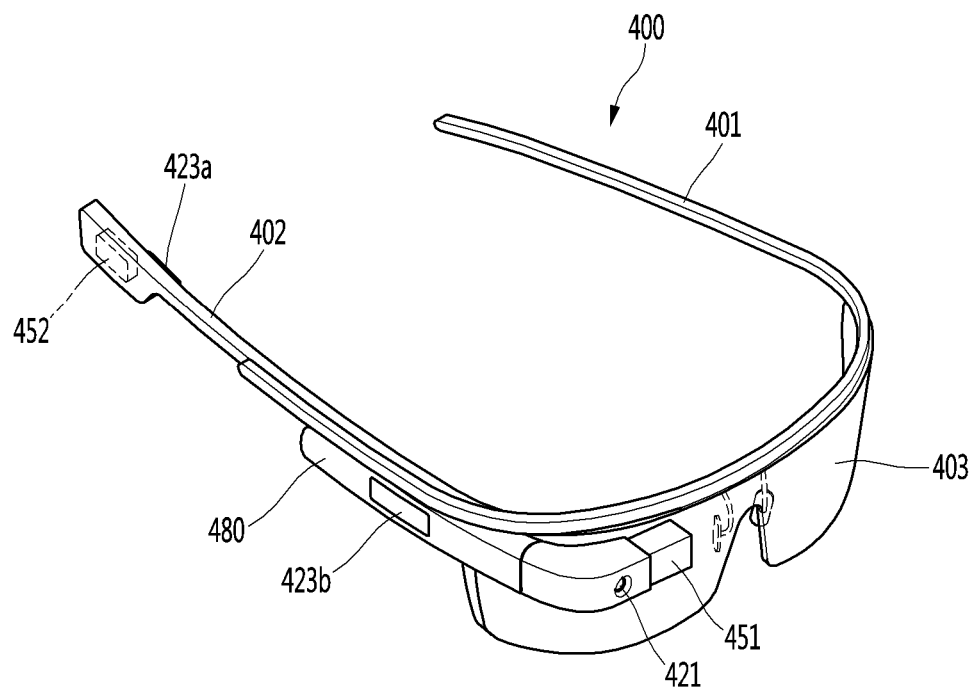
FIG. 4 is a view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes if the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. If the audio output module 452 is implemented in the osteoconductive manner, the audio output module 452 may be closely adhered to the head if the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised if the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold if the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), UltraWideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

If the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

In the following embodiments, a speech agent may be a program for recognizing a user's speech and audibly outputting a response suiting the recognized speech.

An artificial intelligence device 500 may have a plurality of speech agents and output a response using a speech agent suiting a user.

Figure 5:
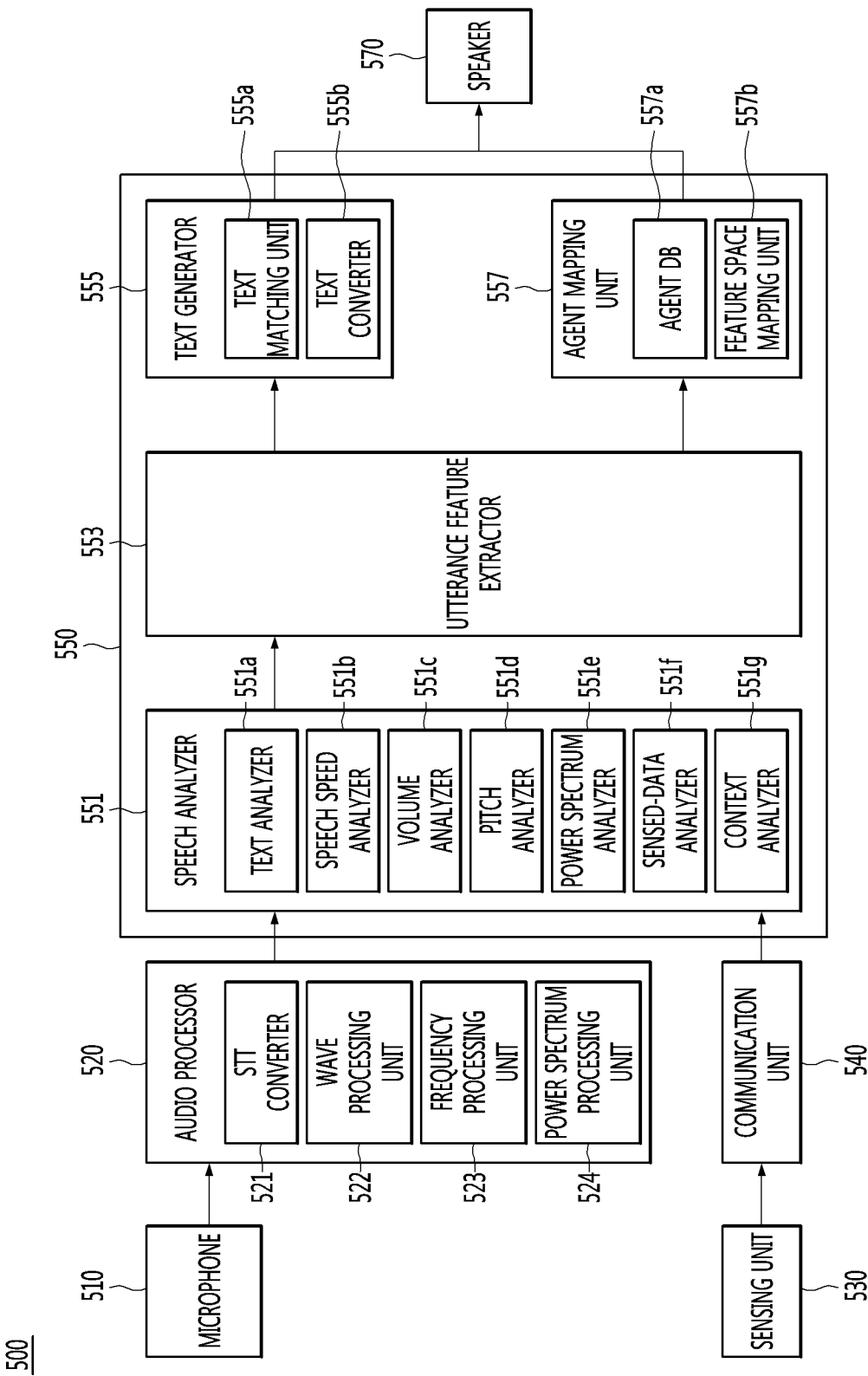
FIG. 5 is a diagram illustrating the detailed configuration of an artificial intelligence device according to an embodiment of the present invention.

FIG. 5 is a diagram illustrating the configuration of an artificial intelligence device according to an embodiment of the present invention.

The artificial intelligence device 500 of FIG. 5 may be an example of the mobile terminal 100 described with reference to FIGS. 1 to 4.

Accordingly, the components of the artificial intelligence device 500 of FIG. 5 will be described in association with the components 100 of the mobile terminal 100 described with reference to FIG. 1a.

Referring to FIG. 5, an artificial intelligence device 500 according to an embodiment of the present disclosure may include a microphone 510, an audio processor 520, a sensing unit 530, a communication unit 540, a controller 550 and a speaker 570.

The microphone 510 may acquire a user's speech.

The microphone 510 may convert an external acoustic signal into electrical speech data.

The converted speech data may be variously used according to the function (or the application program) performed in the artificial intelligence device 500. Meanwhile, in the microphone 510, various noise cancellation algorithms for cancelling noise generated when the external acoustic signal is received may be implemented.

The audio processor 520 may pre-process the received user's speech.

The audio processor 520 may include a speech-to-text (STT) converter 521, a wave processing unit 522, a frequency processing unit 523 and a power spectrum processing unit 524.

The STT converter 521 may convert the received speech into text.

The wave processing unit 522 may extract a speech waveform corresponding to the received speech.

The frequency processing unit 523 may extract a frequency band of the received speech.

The power spectrum processing unit 524 may extract a power spectrum of the received speech.

The sensing unit 530 may sense data on a user's surrounding environment.

The sensing unit 530 may include some or all the components of the sensing unit 140 of FIG. 1a.

The sensing unit 530 may be configured independently of the artificial intelligence device 500.

The communication unit 540 may include some or all the components of the wireless communication unit 110 of FIG. 1a.

The communication unit 540 may perform communication with an external server.

If the sensing unit 530 is configured independently of the artificial intelligence device 500, the communication unit 540 may receive sensed data from the sensing unit 530 and send the sensed data to the controller 550.

The controller 550 may control overall operation of the artificial intelligence device 500.

The controller 550 may include a speech analyzer 551, an utterance feature extractor 553, a text generator 555 and an agent mapping unit 557.

The text analyzer 551a of the speech analyzer 551 may analyze a feature of the converted text. The feature of the text may include a word or a topic, or a combination and/or multiple of each.

The speech speed analyzer 551b of the speech analyzer 551 may measure the utterance speed of the user's speech.

The volume analyzer 551c of the speech analyzer 551 may measure the volume of the speech.

The pitch analyzer 551d of the speech analyzer 551 may measure the pitch of the speech. The pitch of the speech may indicate how high or low a frequency of the speech is.

The power spectrum analyzer 551e of the speech analyzer 551 may measure the power spectrum of the speech.

The sensed-data analyzer 551f of the speech analyzer 551 may analyze the user's surrounding environment based on the sensed data acquired by the sensing unit 530.

The context analyzer 551g may analyze the context of the user's surrounding environment of the user using the sensed data or the received speech.

The utterance feature extractor 553 may extract the utterance feature of the user based on the result of analysis of the speech analyzer 551.

In one embodiment, the utterance feature of the user to be extracted based on the result of the analysis of the speech analyzer 551 may include a focus on one or more of a word and/or topic of the speech a dialect and/or accent of the speech, and speed and/or style of the speech, gender of the user, an age of the user.

The text generator 555 may generate text corresponding to a speech responding to the speech received from the user.

The text generator 555 may include a text matching unit 555a and a text converter 555b.

The text matching unit 555a may perform matching between the speech responding to the user's speech and text.

The text converter 555b may convert the matched text into speech audio.

The agent mapping unit 557 may generate a user type information corresponding to the extracted utterance feature of the user.

In another embodiment, the agent mapping unit 557 may map any one of a plurality of pre-stored user types to the extracted utterance feature.

The agent mapping unit 557 may search for a speech agent most associated with the generated user type information using a feature space analysis technique.

The agent mapping unit 557 may map any one of a plurality of speech agents stored in an agent database 557a to the user type.

The speaker 570 may output an audio response corresponding to the user's speech.

The speaker 570 may output the audio response through a specific speech agent.

Figure 6:
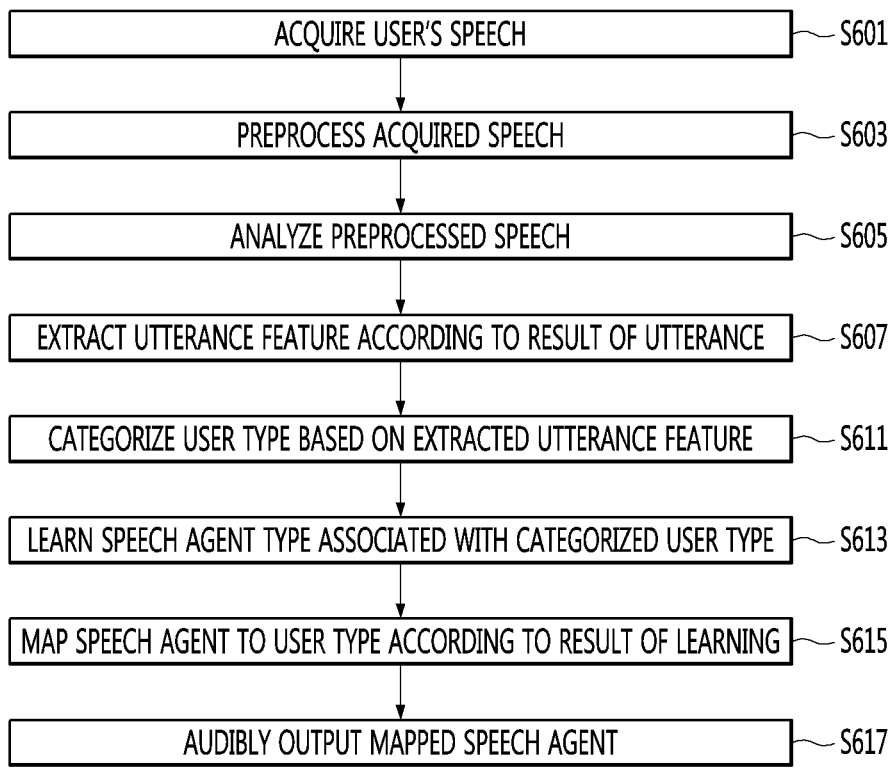
FIG. 6 is a flowchart illustrating a method of operating an artificial intelligence device according to an embodiment of the present invention.

FIG. 6 is a flowchart illustrating a method of operating an artificial intelligence device according to an embodiment of the present invention.

Referring to FIG. 6, the microphone 510 of the artificial intelligence device 500 receives the user's speech (S601).

The audio processor 520 of the artificial intelligence device 500 preprocesses the received user's speech (S603).

An example of the preprocessing step includes canceling a noise from the received speech.

The preprocessing step may further include converting the received speech into text, extracting the waveform of the received speech, extracting the frequency band of the received speech, extracting the power spectrum of the received speech, and the like.

The STT converter 521 of the audio processor 520 may convert the received speech into text.

The wave processing unit 522 of the audio processor 520 may extract the waveform of the received speech.

The frequency processing unit 523 of the audio processor 520 may extract the frequency band of the received speech.

The power spectrum processing unit 524 of the audio processor 520 may extract the power spectrum of the received speech. The power spectrum may be a parameter indicating the magnitude of a certain frequency component included in the waveform given a time-varying wave.

The controller 550 of the artificial intelligence device 500 analyzes the preprocessed speech in order to extract the utterance feature of the user (S605).

The speech analyzer 551 of the controller 550 may analyze the preprocessed speech using one or more of the text corresponding to the speech, the waveform of the speech, the frequency band of the speech and the power spectrum of the speech, discussed below.

The text analyzer 551a of the speech analyzer 551 may analyze the feature of the converted text, where the analysis may include extracting a keyword of the text and determining an intent of the speaker using the extracted keyword. The feature of the text may include one or more of keyword and topic of the text.

The speech speed analyzer 551b of the speech analyzer 551 may measure the utterance speed of the user's speech.

The volume analyzer 551c of the speech analyzer 551 may measure the volume of the speech.

The pitch analyzer 551d of the speech analyzer 551 may measure the pitch of the speech. The pitch of the speech may indicate how high or low frequency the speech audio is.

The power spectrum analyzer 551e of the speech analyzer 551 may measure the power spectrum of the speech.

The controller 550 of the artificial intelligence device 500 extracts the utterance feature of the user according to the result of analysis (S607).

Specifically, the utterance feature extractor of the controller 550 may extract an utterance feature of the user based on the result of analysis of the speech analyzer 551.

In one embodiment, the utterance feature of the user may include one or more of a keyword word within the speech and/or a topic of the speech, a particular dialect and/or accent of the speech, and a speed and/or style of the speech.

In one embodiment, the utterance feature extractor 553 may extract the utterance feature such as word, topic and dialect of the speech using the converted text.

In another embodiment, the utterance feature extractor 553 may extract the accent and/or style of the speech using one or more of the volume and pitch of the speech.

In another embodiment, the utterance feature extractor 553 may extract the utterance speed using the result of analysis of the speech speed analyzer 551b.

The controller 550 of the artificial intelligence device 500 generates a user type according to the extracted utterance feature of the user (S609).

In one embodiment, the agent mapping unit 557 of the controller 550 may generate the user type corresponding to the extracted utterance feature of the user.

The user type may indicate a common utterance feature.

For example, if the utterance feature of the user is a dialect of the first area, the type of the user may be classified as a first user type corresponding to that first area dialect, and if the utterance feature of the user is a dialect of the second area, the user type may be classified into a second user type corresponding to that second area dialect.

In another embodiment, the agent mapping unit 557 may map any one of a plurality of pre-stored user types to the extracted utterance feature.

The controller 550 of the artificial intelligence device 500 learns the speech agent type associated with the generated user type (S611).

The agent mapping unit 557 of the controller 550 may search for the speech agent most associated with the generated user type using a feature space analysis technique.

The controller 550 can find a voice agent most similar to the user type among a plurality of preset voice agent types distributed in a feature space. This will be described with reference to FIG. 9.

The controller 550 of the artificial intelligence device 500 maps the speech agent to the user type according to the result of learning (S613), or based on the trained learning model.

The agent mapping unit 557 of the controller 550 may map any one of the plurality of speech agents stored in the agent database 557a to the user type according to the result of learning, or based on the trained learning model.

The controller 550 of the artificial intelligence device 500 outputs an audio response to the user's speech through the mapped speech agent (S615).

The text generator 555 of the controller 550 may generate the text responding to the user's speech and convert the generated text into the audio response.

The agent mapping unit 557 of the controller 550 may output the converted audio response through the speaker 570 using the mapped speech agent.

Thus, according to an embodiment of the present invention, it is possible to provide a customized speech support service by categorizing a user type according to the utterance feature of the user and mapping the speech agent suiting the categorized user type.

Figure 7:
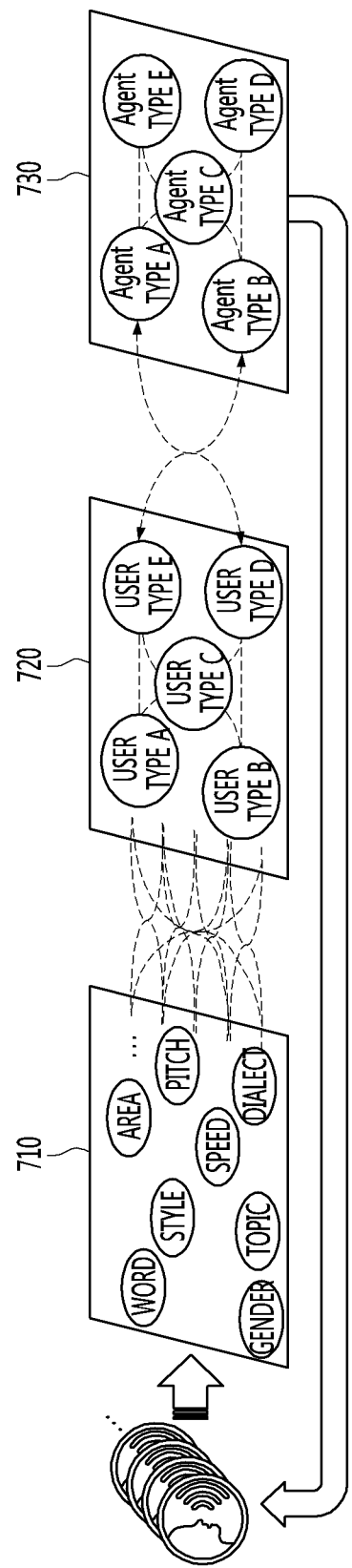
FIG. 7 is a view showing a process of selecting a user type corresponding to an utterance feature of a user and mapping a speech agent corresponding to the selected user type according to an embodiment of the present invention.

FIG. 7 is a view showing an example of a process of selecting a user type corresponding to an utterance feature of a user and mapping a speech agent corresponding to the selected user type according to an embodiment of the present disclosure.

Referring to FIG. 7, an utterance feature group 710 may be extracted using the speech of the user.

The utterance feature group 710 may include a plurality of utterance feature items. The plurality of utterance feature items may include one or more of word within the speech, a particular speech style, a geographic area associated with the speech, an utterance speed, a pitch, a gender of the speaker, a topic of the speech, or a particular dialect of the speech.

The artificial intelligence device 500 may select a user type from a user type group 720 using the plurality of extracted utterance feature group 710.

The user type group 720 may include a plurality of user types A to E. However, five types are merely exemplary.

For example, the artificial intelligence device 500 may categorize the user type of a user who uses the dialect of a specific area as Type A.

As another example, the artificial intelligence device 500 may categorize the user type of a user who speaks at a specific utterance speed as Type B.

As another example, the artificial intelligence device 500 may categorize the user type of a user who uses the dialect of a specific area and speaks at a specific utterance speed as Type C. It will be understood that a user may be associated with one or more user types simultaneously. In some cases, the artificial intelligence device 500 may categorize the user as a user type most strongly associated with the user's speech, a first user type encountered, a last user type encountered, a randomly selected user type, any combination of these or the like.

The artificial intelligence device 500 may map any one of the plurality of speech agents A to E included in a speech agent group 730 to the user type.

The artificial intelligence device 500 may map one user type to one speech agent according to inference from association between the user type and the speech agent For example, the speech agent A may be a speech agent which outputs a response in the dialect of a specific geographic area.

As another example, the speech agent B may be a speech agent which outputs a response at a specific utterance speed.

As another example, the speech agent C may be a speech agent which outputs a response in the dialect of a specific area at a specific utterance speed.

The artificial intelligence device 500 may map the speech agent corresponding to a user according to the embodiment of FIG. 7.

According to another embodiment of the present invention, it is possible to change a speech agent according to the user's situation. This will be described below.

FIG. 8 is a table showing examples of extracting and analyzing a user's utterance feature according to an embodiment of the present invention.

For example, referring to FIG. 8, in some cases the artificial intelligence device 500 may extract the words as an utterance feature using a Bag-Of-Word Model technique using text corresponding to a user's speech as an extraction source.

The Bag-Of-Word Model technique refers to a technique of extracting mainly used words based on the frequency of words in a sentence. Specifically, the Bag-Of-Word Model technique refers to a technique of extracting unique words from a sentence, characterizing the sentence by expressing the frequency of each of the extracted words in a vector or other similar data structure, and determining the features of the words.

In some cases, the artificial intelligence device 500 may extract a topic of the speech as an utterance feature from the text using a text categorization technique.

Text categorization may be a method of extracting a topic from text of a speech using a morphological/semantic analysis technique, for the purpose of summarizing the text.

In some cases, the artificial intelligence device 500 may extract a tone of the speech as an utterance feature through stem/ending analysis using text and audio corresponding to the user's speech.

In some cases, the artificial intelligence device 500 may extract a gender of the user as an utterance feature and the pitch of the speech through pitch analysis using the audio of the speech.

In some cases, the artificial intelligence device 500 may extract an utterance speed through the number of words uttered per unit of time with based on the audio of the speech.

In some cases, the artificial intelligence device 500 may extract an age range of the user as an utterance feature using the power spectrum of the speech.

In some cases, the artificial intelligence device 500 may extract a position of the speaker using a position information module included in the communication unit 540.

Figure 9:
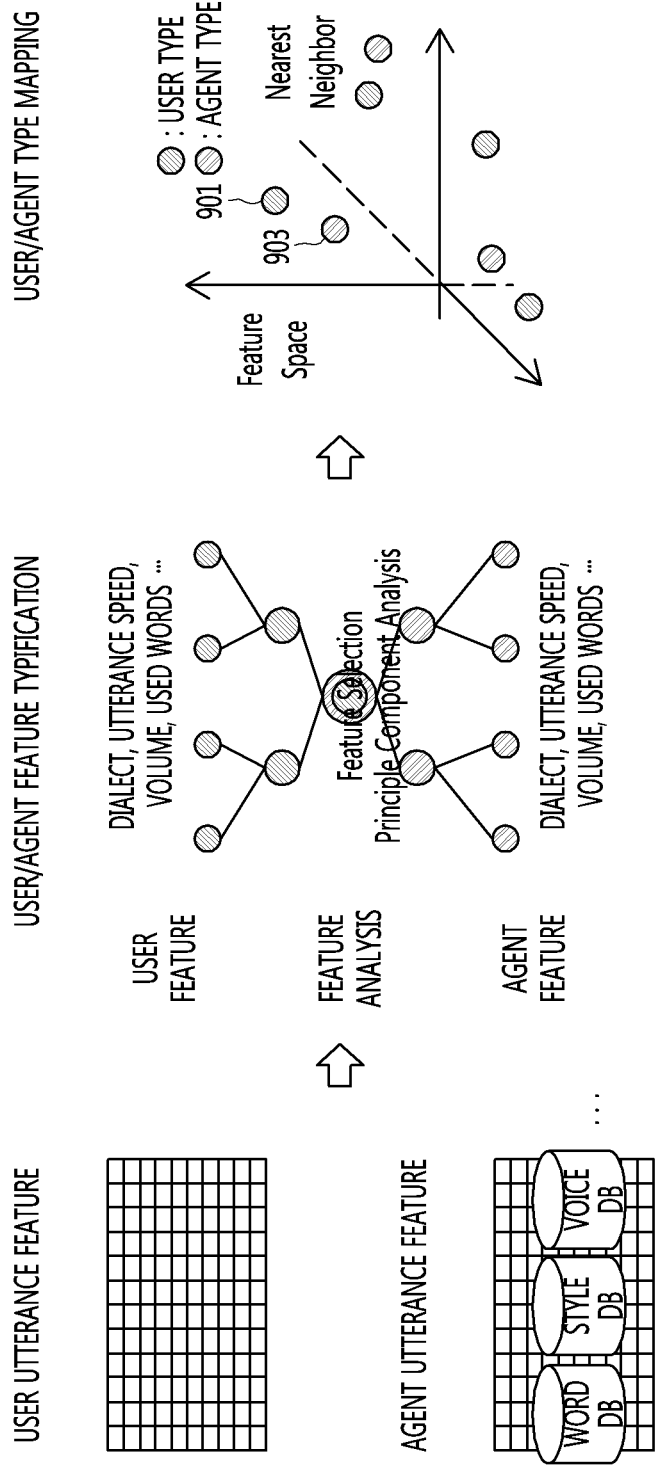
FIG. 9 is a view showing a process of categorizing user types using the utterance feature extracted in FIG. 8 and mapping the categorized user types to speech agents according to an embodiment of the present invention.

FIG. 9 is a view showing a process of categorizing user types using the utterance feature, extracted in FIG. 8 for example, and mapping the categorized user types to speech agents according to an embodiment of the present disclosure.

Referring to FIG. 9, the controller 550 of the artificial intelligence device 500 may obtain the utterance features of the user, for example based on the discussed embodiments of FIG. 8.

the controller 550 categorizes the extracted features according to a degree of importance using a feature selection technique and discards (deletes) items with a low degree of importance.

For example, for a male user using a standard language, the user's utterance speed may be a first rate, the pitch of the speech may be a first level, and the dialect feature can be determined as a feature with a low importance.

The controller 550 may obtain a user type 901 in which the user's gender is male, the user's utterance speed is the first rate, and the pitch of the speech has the first level.

Thereafter, the controller 550 may place the obtained user type 901 on feature space using principle component analysis. User types corresponding to the utterance features of the user may be categorized according to the result of placement.

The feature space is used to characterize data and may be a space categorized according to the utterance features in the present invention.

In addition, the controller 550 may place each of a plurality of predetermined types of speech agent on the feature space.

For example, the first voice agent type may be of a type in which the gender is male, the user's utterance speed is a second rate, and the pitch of the speech has a second level.

The second voice agent type may be of the type in which the gender is female, the user's utterance speed is a third rate, and the pitch of the speech has a third level.

The controller 550 may perform mapping between the user type 901 and the speech agent 903 located at a nearest location in the feature space.

For example, if the gender is male and the first and second speeds, which are speaking speeds, are within the reference range and the first level and the second level, which are pitch of speech, are within a reference level, the controller 550 may match the user type 901 with the first voice agent type 903.

That is, an optimized speech agent may be mapped to the utterance feature of the user. Therefore, it is possible to improve the satisfaction of the user using a speech support service.

FIGS. 10 to 14 are views showing an example of a selecting a speech agent suiting user's speech input according to various embodiments of the present invention.

Figure 10:
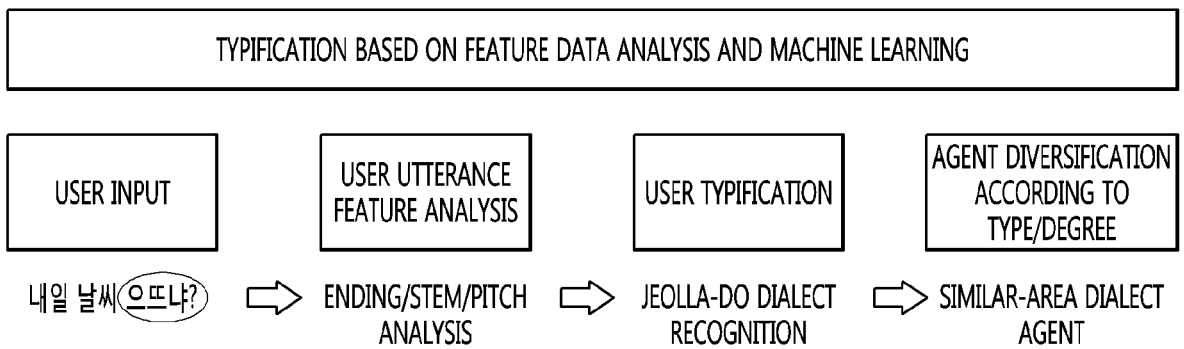
FIGS. 10 to 14 are views showing an example of a selecting a speech agent suiting user's speech input according to various embodiments of the present invention.

Referring to FIG. 10, assume that a user inputs a speech "How is the weather tomorrow" with a dialect to the microphone 510.

The controller 550 of the artificial intelligence device 500 may recognize a particular dialect, which is the utterance feature of the user, through ending/stem/pitch analysis and categorize the user type into a type corresponding to the particular dialect.

The controller 550 may select a speech agent corresponding to the categorized user type and output an audio response through the selected speech agent. Here, the selected speech agent may be an agent for outputting an audio response through the particular dialect.

Next, FIG. 11 will be described.

Figure 11:
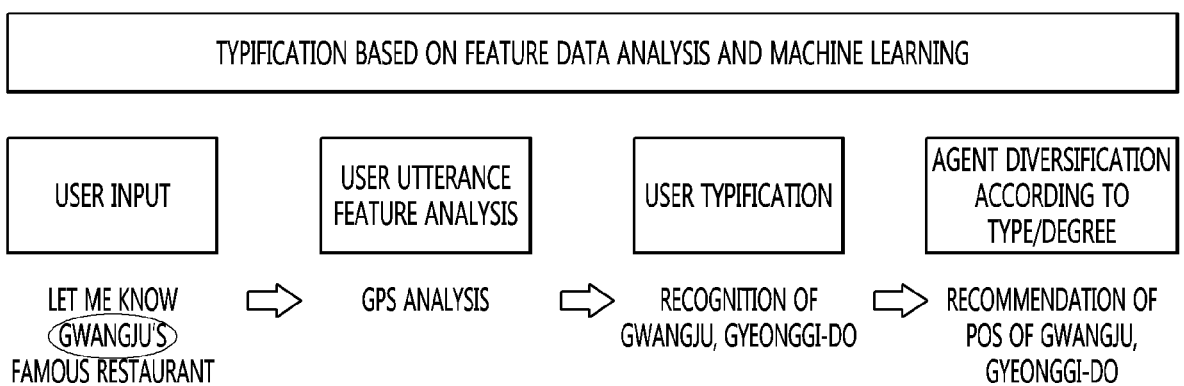

Referring to FIG. 11, assume that a user input voice "Let me know Gwangju's famous restaurant" to the microphone 510.

The controller 550 may recognize the text "Gwangju" and determine the position information of the artificial intelligence device 500 through the position information module.

The controller 550 may categorize the user type into a type corresponding to the user who is in Gwangju, Gyeonggi-do, Korea.

The controller 550 may map a speech agent corresponding to the categorized user type. Here, the mapped speech agent may be specialized for information about the Gwangju, Gyeonggi-do, Korea region.

Next, FIG. 12 will be described.

Figure 12:
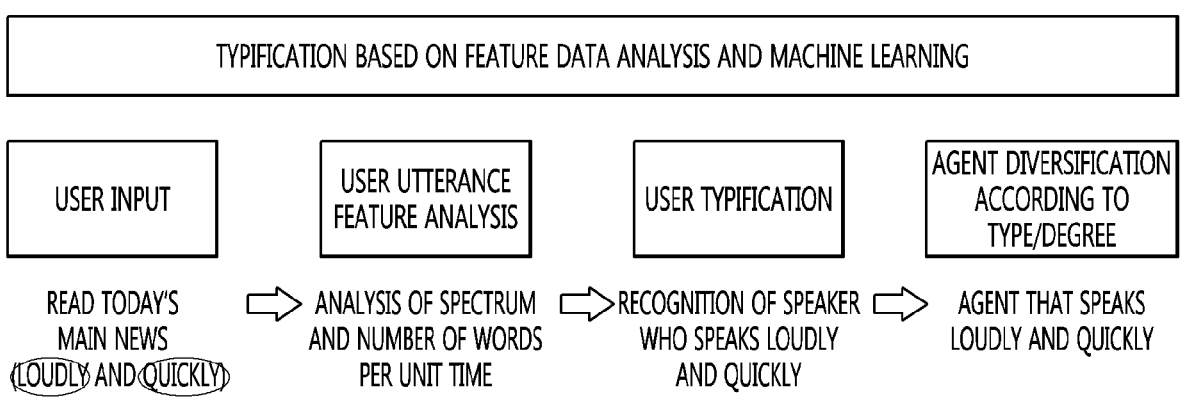

Referring to FIG. 12, in one example a user says "Read today's main news" loudly and quickly.

The controller 550 of the artificial intelligence device 500 may extract the utterance features of the user using the power spectrum of the speech and the number of words uttered per unit time.

That is, the controller 550 may extract the utterance features such as the volume of the speech and the utterance speed of the speech and categorize the user type into a type corresponding thereto.

In addition, the controller 550 may map a speech agent corresponding to the categorized user type.

The mapped speech agent may be an agent for outputting an audio response loudly and quickly.

Next, FIG. 13 will be described.

Figure 13:
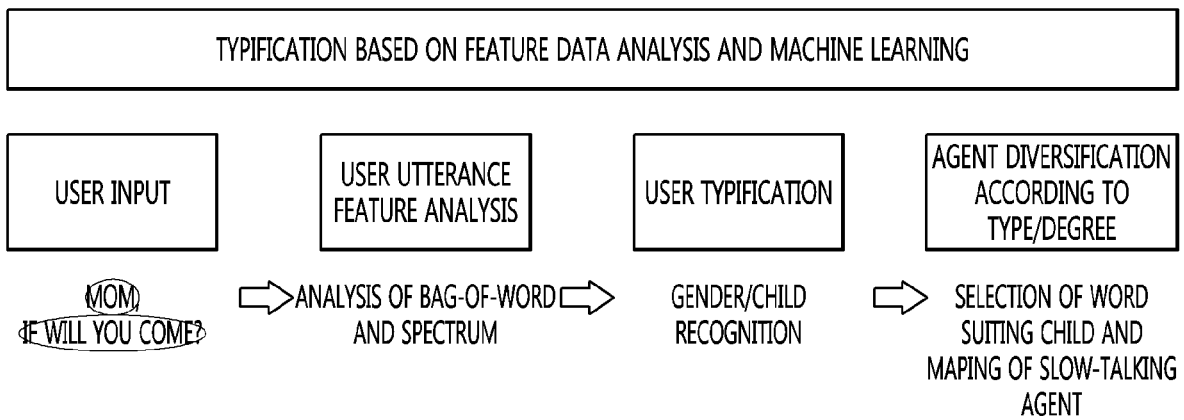

Referring to FIG. 13, in another example a user says "Mom, will you be coming?"

The controller 550 may analyze the user's speech using the Bag-of-Words technique and the power spectrum and extract the utterance features of the user.

If the gender of the user and the age range of the user are extracted as the utterance feature, the controller 550 may categorize the user type into a type corresponding thereto.

Thereafter, the controller 550 may select a word suiting a child and map a slow-talking speech agent to the user type.

Next, FIG. 14 will be described.

Figure 14:
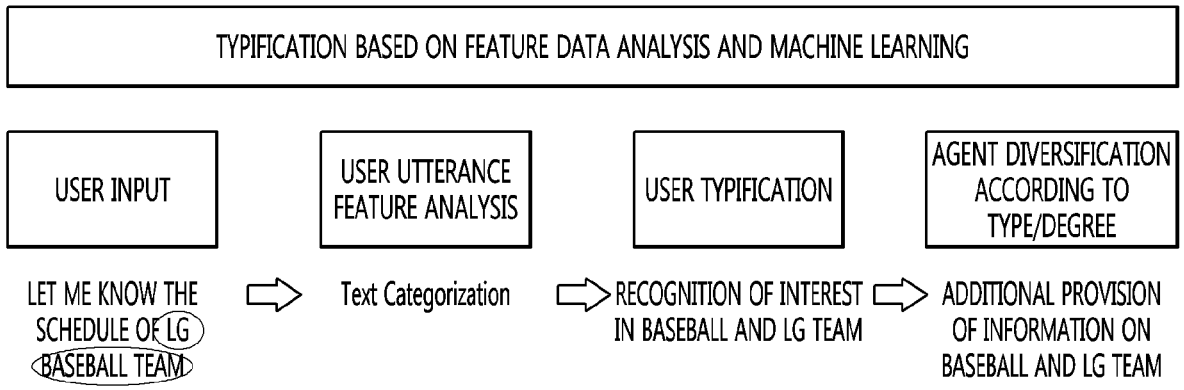

Referring to FIG. 14, in another example a user says "Let me know the schedule of the LG baseball team".

The controller 550 may extract the utterance feature of the user according to a text categorization technique. Here, the extracted utterance feature may be subject/topic.

The controller 550 may categorize the user type into a type having an interest in the LG baseball team. The controller 550 may select a speech agent specialized in retrieving and delivery of information related to the LG baseball team corresponding to the categorized user type.

According to various embodiments of the present invention, the artificial intelligence device 500 may change a speech agent suiting a user and provide a customized speech recognition service.

According to another embodiment of the present invention, the artificial intelligence device 500 may change a speech agent if the utterance feature of one user is changed.

Figure 15:
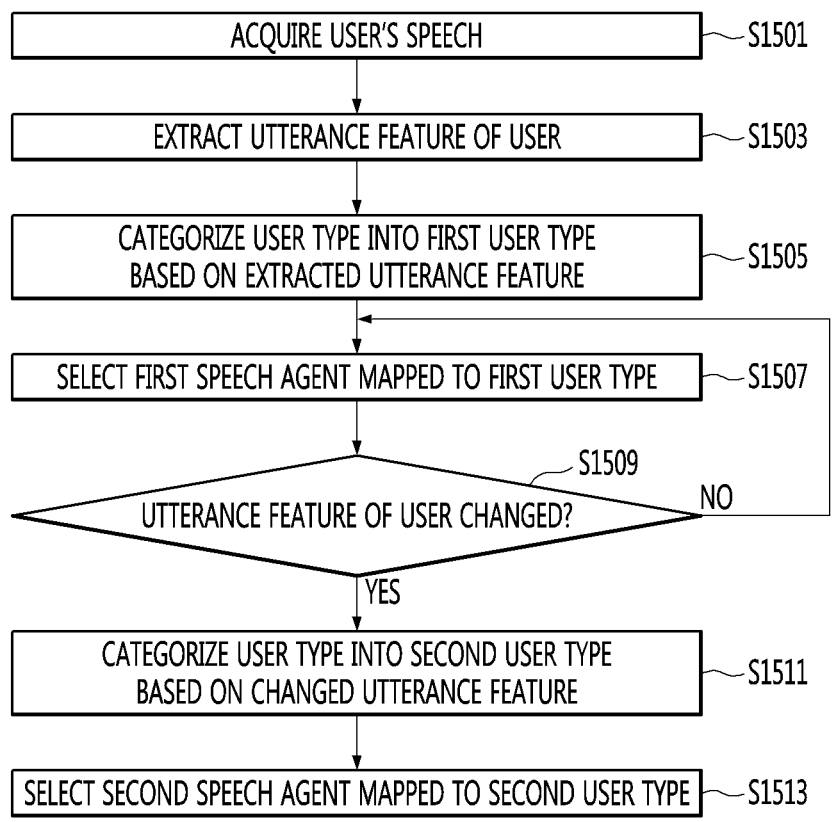
FIG. 15 is a flowchart illustrating a method of operating an artificial intelligence device according to another embodiment of the present invention.

FIG. 15 is a flowchart illustrating a method of operating an artificial intelligence device according to another embodiment of the present invention.

Hereinafter, the embodiment of FIG. 15 will be described in association with FIGS. 5 to 14.

FIG. 15 shows an embodiment in which a speech agent is changed as the utterance feature of one user is changed.

Referring to FIG. 15, the microphone 510 acquires a user's speech (S1501).

The controller 550 of the artificial intelligence device 500 extracts the utterance feature of the user through the acquired speech (S1503).

The controller 550 categorizes a user type into a first user type based on the extracted utterance feature (S1505).

The controller 550 selects a first speech agent mapped to the categorized first user type as the principal agent of a speech support service (S1507).

Thereafter, the controller 550 determines whether the utterance feature of the user has been changed based on an additionally acquired speech (S1509).

For example, the controller 550 may determine that the utterance feature of the user has been changed, if the utterance speed of the firstly acquired speech is a first speed and the secondly acquired speed is a different second speed.

The controller 550 categorizes the user type into a second user type based on the changed utterance feature if the utterance feature of the user has been changed (S1511).

The controller 550 selects a second speech agent mapped to the categorized second user type as the principal agent of the speech support service (S1513).

For example, the controller 550 may change the first speech agent for outputting a speech at a first utterance speed to a second speech agent for outputting a speech at a second utterance speed.

According to the embodiment of the present invention, the artificial intelligence device 500 may select an optimized speech agent as the utterance feature of one user is changed.

Therefore, the user may receive a speech support service suiting a user's state, thereby acquiring improved device usage experience.

According to the embodiment of the present invention, it is possible to provide an optimized speech agent service according to an utterance feature of a user and to provide improved speech service experience to the user.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. An artificial intelligence device comprising:
   a speaker;
   a microphone configured to receive speech from a user; and
   one or more controllers configured to:
   extract an utterance feature of the received speech;
   determine a user type corresponding to the extracted utterance feature;
   map a speech agent associated with the determined user type; and
   output an audio response through the speaker using the mapped speech agent,
   wherein the utterance feature includes one or more of a word, a topic, a dialect, an accent, a stem, an ending, a pitch or an utterance speed of the received speech,
   wherein the one or more controllers is further configured to:
   extract features from a plurality of feature items included in the utterance feature; and
   delete one or more features based on a degree of importance from the extracted features,
   wherein the determined user type is categorized by features remaining after the deletion of the one or more features.

2. The artificial intelligence device of claim 1, wherein the one or more controllers is further configured to place the user type and the speech agent in a feature space and map a user type and a speech agent located at a nearest position in the feature space.

3. The artificial intelligence device of claim 1, wherein, the one or more controllers is further configured to map the user type to the speech agent for outputting a speech with a dialect of a specific area based on the utterance feature including the dialect of the specific area.

4. The artificial intelligence device of claim 1, wherein, the one or more controllers is configured to map the user type to a speech agent for outputting a speech at a specific utterance speed based on the utterance feature including the specific utterance speed.

5. The artificial intelligence device of claim 1, wherein, the one or more controllers is further configured to map the user type to a speech agent for outputting a speech with a dialect of a specific area at a specific utterance speed based on the utterance feature including the dialect of the specific area and the specific utterance speed.

6. An artificial intelligence device comprising:
   a speaker;
   a microphone configured to receive a first speech from a user; and
   a controller configured to:
   extract a first utterance feature of the received first speech;
   determine a first user type corresponding to the extracted first utterance feature;
   map a first speech agent associated with the determined first user type;
   output a first audio response through the speaker using the mapped first speech agent;
   receive a second speech; and
   map a second speech agent associated with a second user type corresponding to a second utterance feature extracted from the second speech based on the second utterance feature being changed from the extracted first utterance feature.

7. The artificial intelligence device of claim 6, wherein the controller is further configured to:
   extract the second utterance feature from the second speech;
   determine the second user type corresponding to the extracted second utterance feature based on the extracted second utterance feature being different from the first utterance feature; and
   output a second audio response through the speaker using the mapped second speech agent.

8. The artificial intelligence device of claim 7, wherein the first utterance feature includes one or more of a word, a topic, a dialect, an accent, a stem, an ending, a pitch or an utterance speed of the first speech.

9. The artificial intelligence device of claim 8, wherein, the one or more controllers is further configured to select the second speech agent for outputting responses at a second utterance speed when the first utterance feature is a first utterance speed and the second utterance feature is a second utterance speed.

10. The artificial intelligence device of claim 8, wherein the one or more controllers is further configured to:
    extract features from a plurality of feature items included in the first utterance feature; and
    delete one or more features with a low degree of importance from the extracted features,
    wherein the determined first user type is categorized by features remaining after the deletion of the one or more features.

11. The artificial intelligence device of claim 10, wherein the one or more controllers is further configured to place the user type and the speech agent in a feature space and map a user type and a speech agent located at a nearest position in the feature space.

* * * * *